(12) United States Patent
Hayashi (10) Patent No.: US 7,552,683 B2
(45) Date of Patent: Jun. 30, 2009

(54) CONVEYING APPARATUS WITH LIFTING/LOWERING PLATFORM

(75) Inventor: Nobuhiro Hayashi, Shiga (JP)

(73) Assignee: DAIFUKU Co., Ltd., Osaka (JP)

( * ) Notice: Subject to any disclaimer, the term of this patent is extended or adjusted under 35 U.S.C. 154(b) by 191 days.

(21) Appl. No.: 11/631,833

(22) PCT Filed: Aug. 2, 2005

(86) PCT No.: PCT/JP2005/014085

§ 371 (c)(1),
(2), (4) Date: Jan. 5, 2007

(87) PCT Pub. No.: WO2006/022121

PCT Pub. Date: Mar. 2, 2006

(65) Prior Publication Data

US 2008/0028973 A1  Feb. 7, 2008

(30) Foreign Application Priority Data

Aug. 26, 2004 (JP) ............................. 2004-246384

(51) Int. Cl.
*B61B 3/00* (2006.01)
*B60P 1/00* (2006.01)
(52) U.S. Cl. ..................... 104/89; 414/540; 414/541
(58) Field of Classification Search ............... 104/89; 414/281, 279, 540, 541, 187, 589; 14/69.5, 14/71.3, 71.5, 71.7
See application file for complete search history.

(56) References Cited

U.S. PATENT DOCUMENTS

| | | | | |
|---|---|---|---|---|
| 3,912,048 A | * | 10/1975 | Manning | 414/541 |
| 4,221,280 A | * | 9/1980 | Richards | 187/269 |
| 4,394,888 A | * | 7/1983 | Clarke | 187/401 |
| 4,488,326 A | * | 12/1984 | Cherry | 14/72.5 |
| 4,746,262 A | * | 5/1988 | Anderson | 414/495 |

(Continued)

FOREIGN PATENT DOCUMENTS

JP  07172538 A  *  7/1995

(Continued)

*Primary Examiner*—Mark T Le
*Assistant Examiner*—Jason C Smith
(74) *Attorney, Agent, or Firm*—St. Onge Steward Johnston & Reens LLC (57) ABSTRACT

A lifting stroke of a platform (3), liftably/lowerably supported through a cross link (13a), of a traveling body (1) for conveyance is increased with a low floor structure of the traveling body (1) maintained. In a conveying apparatus having the lifting/lowering platform, there are laid a first cam rail (47A) working on a first to-be-operated portion (28) to lift the platform (3) to a middle height (H1) and a second cam rail (48) working on a second to-be-operated portion (29) to lift the platform (3) from the middle height (H1) to the maximum height (H2). The second to-be-operated portion (29) is provided at a middle bending fulcrum (36) of a toggle link (32) interposed between the cross link (13a) and a fixing position on the conveying traveler body (1) side. When the platform (3) is lifted to the middle height (H1), the toggle link (32) is extended such that both upper fulcrums (37, 39) are separated, relative to the middle bending fulcrum (36), to both the front and rear in the traveling direction. The second to-be-operated portion (29) in this extended state of the toggle link (32) is positioned below the first to-be-operated portion (28) in the same state.

12 Claims, 7 Drawing Sheets

U.S. PATENT DOCUMENTS

| | | | |
|---|---|---|---|
| 4,995,130 A * | 2/1991 | Hahn et al. | 14/71.3 |
| 5,054,578 A * | 10/1991 | Smillie et al. | 182/69.4 |
| 5,105,915 A * | 4/1992 | Gary | 187/200 |
| 5,111,546 A * | 5/1992 | Hahn et al. | 14/71.3 |
| 5,346,355 A * | 9/1994 | Riemer | 414/542 |
| 5,460,460 A * | 10/1995 | Alexander | 14/71.3 |
| 6,024,528 A * | 2/2000 | Taylor | 414/495 |
| 6,257,372 B1 * | 7/2001 | Schirmer | 187/269 |
| 7,069,611 B2 * | 7/2006 | Larson | 14/71.3 |
| 7,179,040 B2 * | 2/2007 | Masuda et al. | 414/462 |
| 2004/0057823 A1 * | 3/2004 | Morris | 414/540 |
| 2007/0020075 A1 * | 1/2007 | Kelly | 414/540 |
| 2007/0140820 A1 * | 6/2007 | Miller | 414/540 |
| 2008/0028973 A1 * | 2/2008 | Hayashi | 104/89 |
| 2008/0063498 A1 * | 3/2008 | Lambert et al. | 414/540 |
| 2008/0101905 A1 * | 5/2008 | Morris et al. | 414/540 |

FOREIGN PATENT DOCUMENTS

| | | |
|---|---|---|
| JP | 07172539 A * | 7/1995 |
| JP | H07-172538 | 7/1995 |

* cited by examiner

CONVEYING APPARATUS WITH LIFTING/LOWERING PLATFORM

FIELD OF THE INVENTION

The present invention relates to a conveying apparatus formed so as to selectively move a platform supported on a conveying traveler body so as to be liftable and lowerable via erectable crosslinks to a lifted position by a cam rail laid down on the side of a conveying route.

DESCRIPTION OF THE PRIOR ART

For this type of conveying apparatus, as is also described in Patent Literature 1, concurrently provided is, with crosslinks that support a platform so as to be freely liftable and lowerable, a to-be-operated portion formed of a lifting/lowering member that thrusts up the crosslinks so as to make the same stand up by rising, and the lifting/lowering member is thrust up by a cam rail on the side of a conveying route so as to lift the platform.

Patent Literature 1: Japanese Published Unexamined Patent Application No. H07-172538

In the conveying apparatus, a lifting stroke of the platform can be make greater than a lifting stroke of the lifting/lowering member by providing a thrusting operation position by the lifting/lowering member on the crosslinks at a center crossover fulcrum position of the crosslinks or closer to a link fulcrum position on the conveying traveler body side than the center crossover fulcrum position. Even in this method, however, in order to increase the lifting stroke of the platform so as to sufficiently raise a lifted position thereof in height, the lifting stroke of the lifting/lowering member must be correspondingly increased. Consequently, not only a part of the lifting/lowering member protruding to a downside of the conveying traveler body but also the cam rail laid down on a floor on the conveying route side will be higher, whereby it becomes impossible to lower an upper surface of the conveying traveler body (working floor on the conveying traveler body), that is, the conveying traveler body can not be made with a low-floor structure.

SUMMARY OF THE INVENTION

It is an object of the present invention to provide a conveying apparatus that can eliminate conventional problems as described above, and means therefore will be shown with reference numerals in embodiments to be described later denoted in parentheses. In a conveying apparatus in which a platform (3) is supported on a conveying traveler body (1) so as to be so as to be freely liftable and lowerable via a erectable crosslink (13a), and a first cam rail (47A) and a second cam rail (48) is laid down, the first cam rail (47A) that works on a first to-be-operated portion (28) provided concurrently with the crosslink (13a) and protruded to the downside of the conveying traveler body (1) so as to lift the platform (3) to a middle height (H1), and a second cam rail (48) that works on a second to-be-operated portion (29) provided concurrently with the crosslink (13a) and protruded to a downside of the conveying traveler body (1) so as to lift the platform (3) from the middle height (H1) to a maximum height (H2), the second to-be-operated portion (29) is provided at a middle bending fulcrum (36) of a toggle link (32) interposed between a link (14a) of the crosslink (13a) and a fixing position on the conveying traveler body (1) side or in a vicinity thereof, the toggle link (32) is collapsed into a condition where upper both-end fulcrums (37 and 39) are located at either front or rear side in a traveling direction with respect to the middle bending fulcrum (36) when the platform (3) is located at a lowering limit height and is extended, when the platform (3) has been lifted to the middle height (H1), so that the upper both-end fulcrums (37 and 39) reach a condition separated at both front and rear sides in the traveling direction with respect to the middle bending fulcrum (36), and the second to-be-operated portion (29) in the extended condition is located lower than the first to-be-operated portion (28) at this time.

With regard to carrying out the present invention with the above-described configuration, concretely, as in a second aspect of the invention, the first to-be-operated portion (28) can be composed of a cam follower roller (31a) that is supported by a protruded portion (30a) continuously provided downward from the link (14a) of the crosslink (13a) and is directly pushed up by the first cam rail (47A).

In addition, as in a third aspect of the invention, the second to-be-operated portion (29) can be composed of a cam follower roller (33) that is supported by concentrically with the middle bending fulcrum (36) of the toggle link (32) and is directly pushed up by the second cam rail (48). The configuration can be combined with the configuration according to the second aspect of the invention.

Furthermore, as in a fourth aspect of the invention, when the crosslinks are provided side by side as a pair of right and left crosslinks so that respective fulcrums are concentric with each other, the first to-be-operated portion (28) can be composed of a pair of right and left cam follower rollers (31a and 31b) that are respectively directly pushed up by the juxtaposed two first cam rails (47A) supported by protruding portions (30a and 30b) continuously provided downward from inside links (14a and 15a) of the respective crosslinks (13a and 13b), and the toggle link (32) provided with the second to-be-operated portion (29) can be interposed between a center portion of a hanging member (37) provided so as to hang between the inside links (14a and 15b) of the respective crosslinks (13a and 13b) and a fixing position on the conveying traveler body (1) side, and the single second cam rail (48) that works on the second to-be-operated portion (29) can be disposed at a middle position between the two first cam rails (47A). The configuration can be combined with the configuration according to the second and third aspects of the invention.

In addition, as in a fifth aspect of the invention, a locking means (40) that prevents from carrying out a falling motion of the crosslink (13a) in which the platform (3) is lifted to the maximum height (H2) by the second cam rail (47A) and the second to-be-operated portion (29) can be provided concurrently with the crosslink (13a). The configuration can be combined with the configuration according to any one of the second to fourth aspects of the invention. When the configuration according to the fifth aspect of the invention is employed, as in a sixth aspect of the invention, the locking means (40) can be composed of a latch (42) that is automatically latched with a to-be-latched portion (41) provided at a slide fulcrum position (25) on the conveying traveler body (1) side of the crosslink (13a) or in a vicinity thereof.

By a conveying apparatus according to the present invention with the above-described configuration, the platform is lifted to the maximum objective height by pushing up the same in two stages by use of the first to-be-operated portion and the first cam rails and the second to-be operated portion and the second cam rail. However, it is satisfactory for the first to-be-operated portion and the first cam rails that these can make the crosslinks stand up until a condition where the second to-be-operated portion provided in the vicinity of the middle bending fulcrum of the toggle link can be thrust up by the second cam rail, namely, until the toggle link collapsed into a condition where the upper both-end fulcrums are located at either front or rear side in the traveling direction with respect to the middle bending fulcrum reaches an extended condition where the upper both-end fulcrums are separated at the front and rear in the traveling direction with respect to the middle bending fulcrum, and a lifting stroke of the platform by the first to-be-operated portion and the first cam rails may be sufficiently small in comparison with the total stroke to the maximum objective height. Moreover, as described above, when the platform has been lifted to the middle height by the first to-be-operated portion and the first cam rails, the height of the second to-be-operated portion provided concurrently with the toggle link has hardly been changed from the height when the crosslinks are in a fallen condition (when the platform is located at the lowering limit height) and the second-to-be-operated portion is located sufficiently lower than the first to-be-operated portion pushed up by the first cam rails. Therefore, with the height of the second cam rail that pushes up the second to-be-operated portion being made almost identical to the height of the first cam rails, the platform can be lifted from the middle height to the higher maximum height via the toggle link.

As is apparent from the reason described above, by the configuration of the present invention, while sufficiently lowering the height of a lower space of the conveying traveler body, in other words, while sufficiently lowering the upper surface of the conveying traveler body (working floor on the conveying traveler body) so as to provide the conveying traveler body as a low-floor structure, the maximum height of the platform can be provided as a sufficient height as needed. As a matter of course, such a layout as to lay down only the first cam rails in a specific section of the conveying route so as to use the platform in a manner lifted to the middle height and lay down both the first and second cam rails in the other specific section so as to use the platform in a manner lifted to the maximum height can also be employed.

With regard to carrying out the present invention described above, by employing the configuration according to the second and third aspects of the invention, the present invention can be simply carried out at a low cost.

The crosslinks that support the platform so as to be freely liftable and lowerable are generally provided side by side as a pair of right and left crosslinks so that the respective fulcrums are concentric with each other. In this case, by the configuration according to the fourth aspect of the invention, the platform can be strongly pushed up to the middle height without difficulty by the two right and left first cam rails in a first pushing-up stage where a great pushing-up force is necessary, that is, a first push-up stage where the platform is lifted to the middle height by the first to-be-operated portion and the first cam rails, and in a second pushing-up stage where a smaller pushing-up force is sufficient in comparison with that in the first pushing-up stage, that is, a second pushing-up stage where the platform is lifted to the maximum height by the second to-be-operated portion and the second cam rail, the platform can be lifted to the maximum height in a well-balanced manner by pushing up a center position between the pair of right and left crosslinks by the single second cam rail. Namely, by the configuration according to the fourth aspect of the invention, the present invention can be reasonably carried out when the pair of right and left crosslinks are provided side by side so that the respective fulcrums are concentric with each other.

In the condition where the platform has been lifted to the maximum height, since a link that has reached a vertical posture or a posture close thereto of the toggle link in an extended condition that supports the platform via the crosslinks receives a large compression load, there is a high risk that the link of the toggle link is deformed by buckling or damaged by bending and this leads to a falling accident of the platform. Therefore, according to the configuration of the present invention, particularly, as in the fifth aspect of the invention, by providing, concurrently with the crosslink, a locking means that prevents from carrying out a falling motion of the crosslink in which the platform is lifted to the maximum height by the second cam rail and the second to-be-operated portion, safety can be greatly improved. In this case, by the configuration according to the sixth aspect of the invention, not only can the locking means be carried out with a simple configuration, but also no special locking operation or control is necessary when the platform has been lifted to the highest position, so that the present invention can be carried out at a low cost.

DESCRIPTION OF THE PREFERRED EMBODIMENTS

Figures 1, 1A:
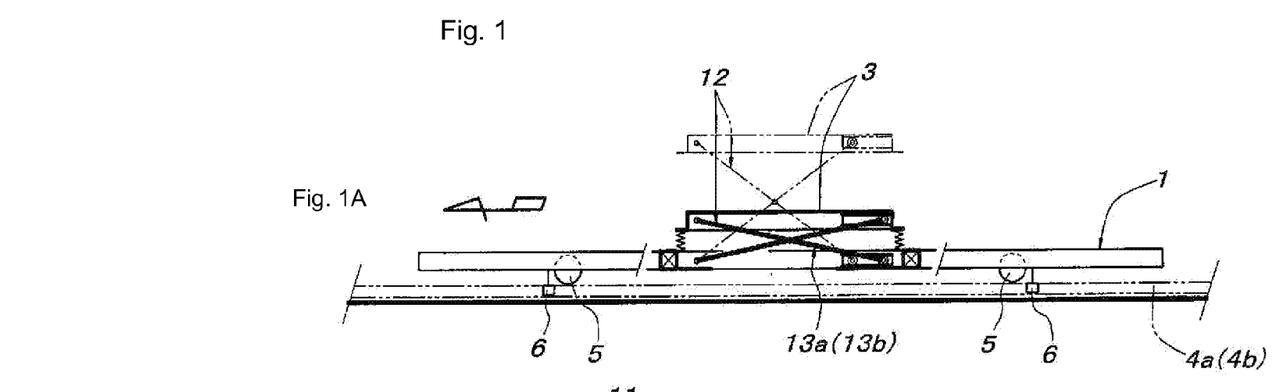
FIG. 1A is a partially longitudinally sectional schematic side view explaining a basic configuration of a conveying apparatus of the present invention.
Figure 1B:
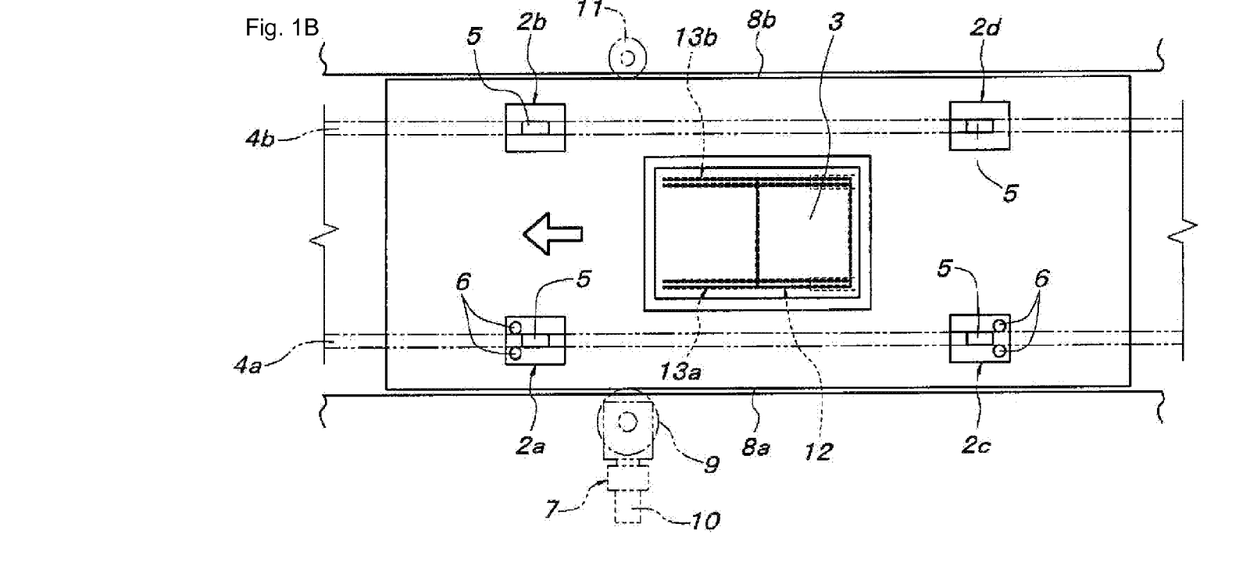
FIG. 1B is a schematic plan view of the same conveying apparatus.

Hereinafter, detailed embodiments of the present invention will be described based on the accompanying drawings. FIG. 1 exemplify a basic configuration of a friction-drive type conveying apparatus with a freely liftable and lowerable platform. Reference numeral 1 denotes a flat rectangular carriage-type conveying traveler body along a traveling direction, which is equipped with two front and rear sets of right and left pairs of wheel units 2a to 2d and a freely liftable and lowerable platform 3. The respective wheel units 2a to 2d have wheels 5 that roll on a pair of right and left guide rails 4a and 4b laid down along a conveying route, and in the two front and rear wheel units 2a and 2c on one of the right and left sides (in the illustrated example, left side), anti-vibration vertical axis rollers 6 that sandwich the guide rail 4a from both right and left sides are provided. The conveying traveler body 1 is propelled by a friction drive means 7 concurrently provided at an appropriate point of the conveying route. The friction drive means 7 is conventionally well known and composed of a drive friction wheel 9 that abuts on one friction surface 8a of a pair of right and left vertical friction surfaces 8a and 8b in parallel formed on the conveying traveler body 1 across the overall length thereof, a motor 10 for rotary drive of the drive friction wheel 9, and a backup roller 11 that abuts on the other friction surface 8b so as to sandwich the conveying traveler body 1 between the same and drive friction wheel 9.

Although the friction drive means 7 has been exemplified as a means for propelling the conveying traveler body 1, a propelling means by any other method may be employed, such as driving at least one of the wheels 5 by a motor, or engaging a drive chain provided in a tensioned state so as to move along the conveying route of the conveying traveler body 1 with the conveying traveler body 1 and propelling the conveying traveler body 1 by the drive chain. In addition, for the vertical friction surfaces 8a and 8b that are necessary in the conveying traveler body 1 when the friction drive means 7 is used, both right and left side surfaces of the conveying traveler body 1 may be diverted as they are, or other members may be attached. Furthermore, although individually independent carriages have been used as the conveying traveler bodies 1, the conveying device may be one in which platforms 3 are disposed at appropriate intervals on a conveying traveler body 1 that continues in the conveying route direction, as in a slat conveyer.

The platform 3 is a table to support a to-be-carried object, and is supported so as to be vertically movably by a crosslink mechanism 12 interposed between the same and conveying traveler body 1 under the platform 3. This crosslink mechanism 12 is composed of two crosslinks 13a and 13b in parallel with the conveying route juxtaposed to each other under the platform 3.

Details of the crosslink mechanism 12 will be described based on FIG. 2 to FIG. 5. The crosslink mechanism 12 comprises a pair of right and left crosslinks 13a and 13b which includes two pairs of links 14a and 14b, and 15a and 15b whose center crossover portions are pivotally mounted at mutually concentric center fulcrum shafts 16, and of the links 14a to 15b provided two each, front end portions of both links 14a and 15a to be located inside are pivotally mounted so as to be freely swingable up and down by mutually concentric position fixing fulcrum shafts 19 on a pair of right and left bearing members 18 provided on a support frame 17 on the conveying traveler body 1 side. Rear end portions of both links 14a and 15a are coupled by a common slide fulcrum shaft 20, and rollers 21 supported by both sides of the common slide fulcrum shaft 20 are fitted with a pair of right and left back-and-forth slide guides 22 provided on the downside of a rear end portion of the platform 3 so as to be rollable in the back and forth direction. Of the links 14a and 15b provided two each, front end portions of both links 14b and 15b to be located outside are pivotally mounted so as to be freely swingable up and down by mutually concentric position fixing fulcrum shafts 24 on a pair of right and left bearing members 23 provided, on the downside of a front end portion of the platform 3, at a position directly above the pair of right and left bearing portions 18. Rear end portions of both links 14b and 15b are coupled by a common slide fulcrum shaft 25, and rollers 26 removably supported on both ends of the common slide fulcrum shaft 25 are fitted with a pair of right and left back-and-forth slide guides 27 provided, on the support frame 17 on the conveying traveler body 1 side, at a position directly below the back-and-forth slide guide 22 so as to be rollable in the back and forth direction.

In the crosslink mechanism 12, a first to-be-operated portion 28 and a second to-be-operated portion 29 are concurrently provided. The first to-be-operated portion 28 is composed of cam follower rollers 31a and 31b supported by right and left horizontal shafts mutually concentric with the lower ends of protruding portions 30a and 30b continuously provided downward from both links 14a and 15a to be located inside of the links 14a to 15b provided two each to compose the pair of right and left crosslinks 13a and 13b. The protruding portions 30a and 30b are continuously provided downward, in a middle position between the center fulcrum shafts 16 of both links 14a and 15a and the common slide fulcrum shaft 20, from a position close to the center fulcrum shafts 16, and are structured so that, when the platform 3 is at a lowering limit height as shown in FIG. 2, the cam follower rollers 31a and 31b are located at a position close to the floor in a manner protruded downward from the conveying traveler body 1.

The second to-be-operated portion 29 is composed of one cam follower roller 33 supported by a toggle link 32 concurrently provided in the crosslink mechanism 12. The toggle link 32 is formed by coupling a long link 34 and a short link 35 with each other at a middle bending fulcrum shaft 36. The respective links 34 and 35 are composed of pairs of right and left link units 34a and 34b and 35a and 35b, respectively, and the cam follower roller 33 is removably supported by the middle bending fulcrum shaft 36 between link units 34a and 34b of the long link 34 to be located inside. The toggle link 32 is arranged roughly in the center between the pair of right and left crosslinks 13a and 13b. A free end of the long link 34 is pivotally mounted, in a middle position between the center fulcrum shafts 16 of inside both links 14a and 15a to compose the crosslinks 13a and 13b and the common slide fulcrum shaft 20, by a shaft-like hanging member (spindle member) 37 provided so as to hang between the links 14a and 15a in the right and left horizontal direction. A free end of the short link 35 is pivotally mounted on a bearing member 38 provided as an annex on the support frame 17 on the conveying traveler body 1 side by a spindle 39 located below the center fulcrum shafts 16 of the crosslinks 13a and 13b.

Figure 5:
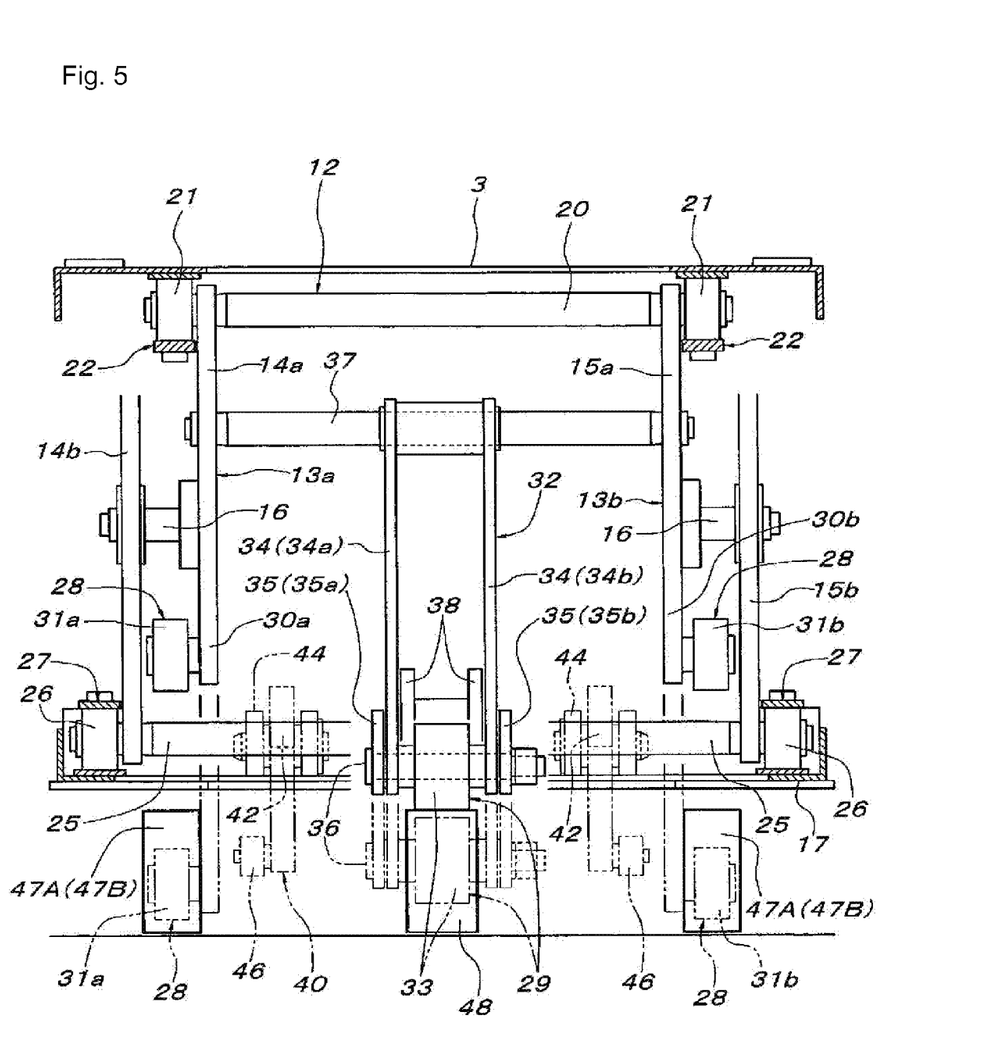
FIG. 5 is a longitudinally sectional rear view showing a main part with a platform lifted to a maximum height.
Figure 6:
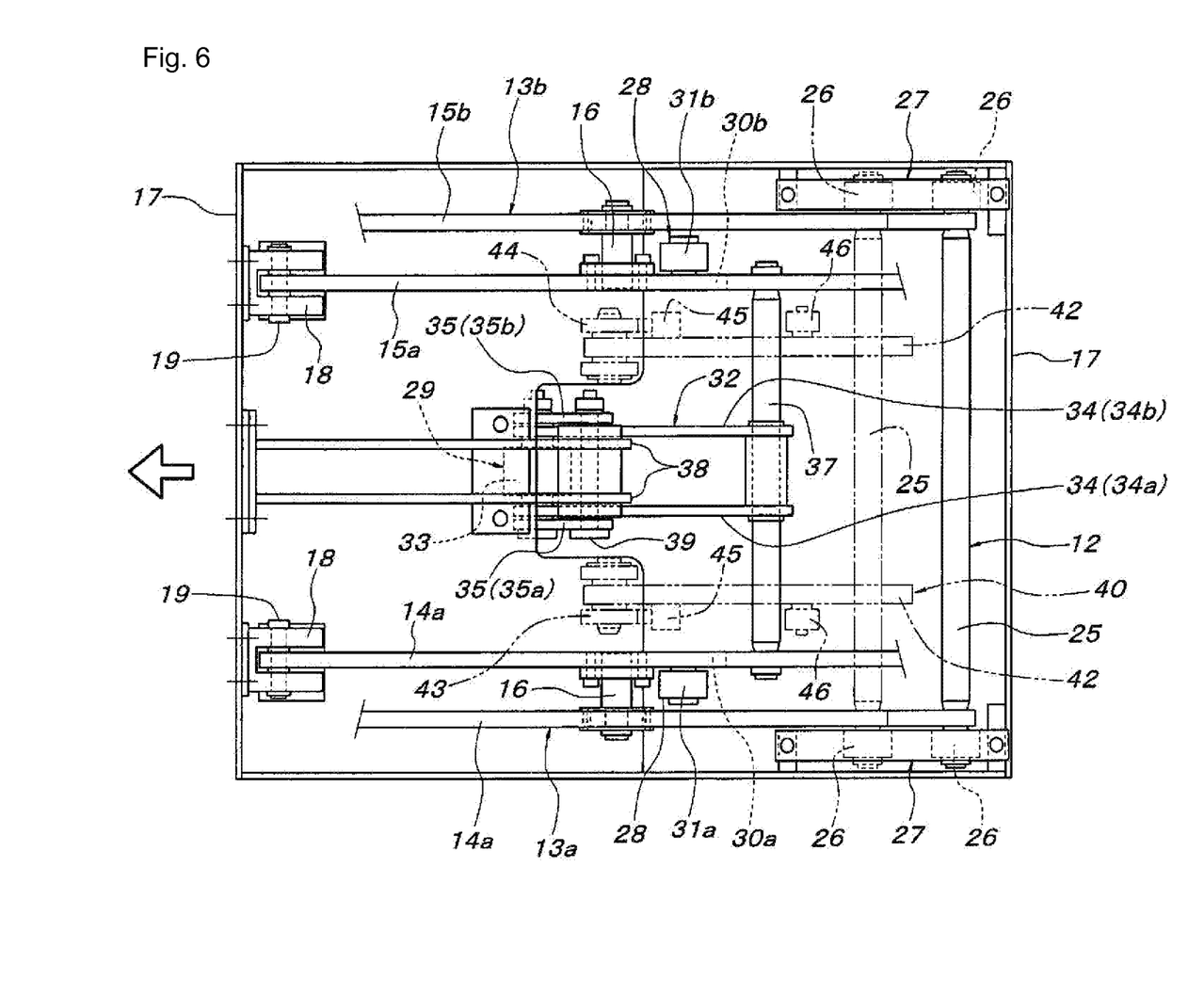
FIG. 6 is a cross-sectional plan view showing a main part with a platform located at a lowering limit height.
Figure 8A:
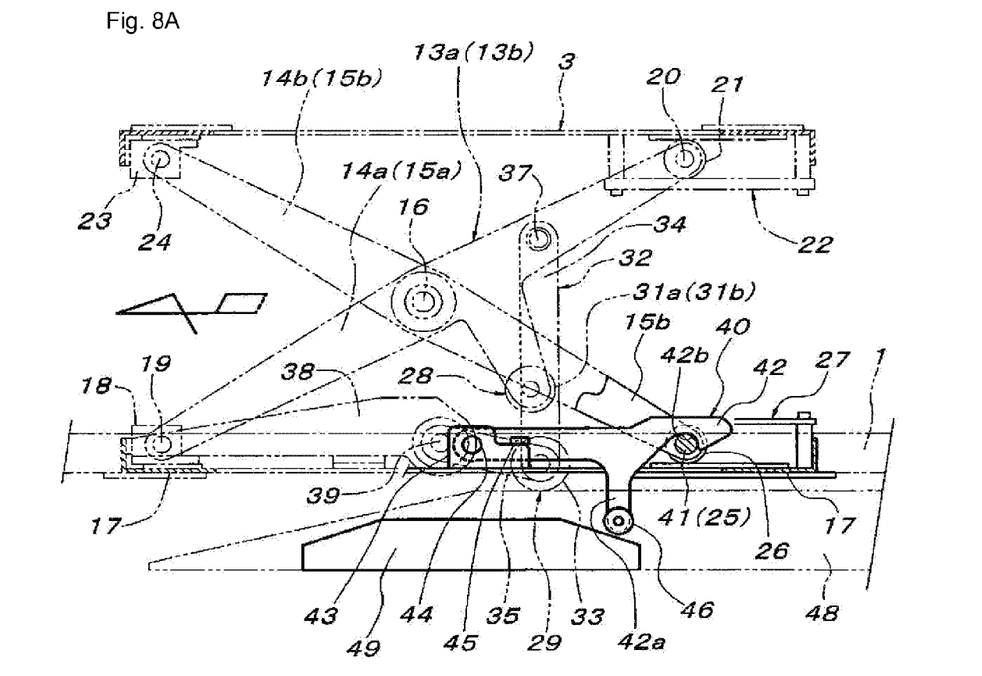
FIG. 8A is a partially longitudinally sectional side view showing a locking means in a locked condition.
Figure 8B:
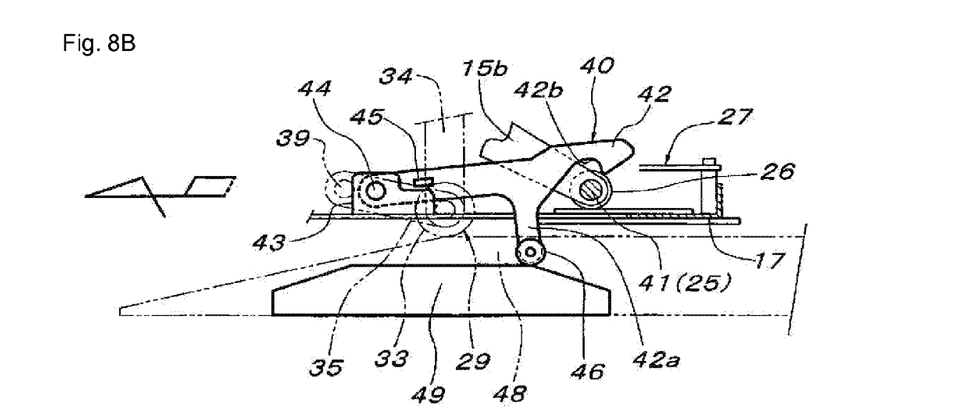
FIG. 8B is a partially longitudinally sectional side view showing a locking means in an unlocked condition.

As shown in virtual lines of FIG. 5 and FIG. 6 and in FIG. 8, in the crosslink mechanism 12, a locking means 40 that supports the platform 3 at a maximum height can be concurrently provided. The locking means 40 includes a pair of right and left latches 42 that use, as to-be-latched portions 41, the common slide fulcrum 25 provided to hang between the outside both links 14a and 15b to compose the crosslinks 13a and 13b and are automatically latched with the to-be-latched portions 41. The respective latches 42 are of an identical structure arranged with respect to the second to-be-operated portion 29 in a condition separated at the right and left so as to be located in the middle between the pair of right and left cam follower rollers 31a and 31b of the first to-be-operated portion 28 and single cam follower roller 33 of the second to-be-operated portion 29. These are respectively supported by the horizontal spindles 44 mutually concentric with bearing members 43 provided on the support frame 17 on the conveying traveler body 1 side so as to be freely swingable up and down, and abutting members 45 annexed to the respective latches 42 are held by gravity at home positions to be caught by the bearing members 43. Moreover, in the respective latches 42, arm portions 42a are integrally provided downward in connected row arrangements, and on the lower ends of the arm portions 42a, cam follower rollers 46 are supported via mutually concentric right and left horizontal spindles. The cam follower rollers 46 are protruded downward further than the bottom surface of the conveying traveler body 1.

Figure 2:
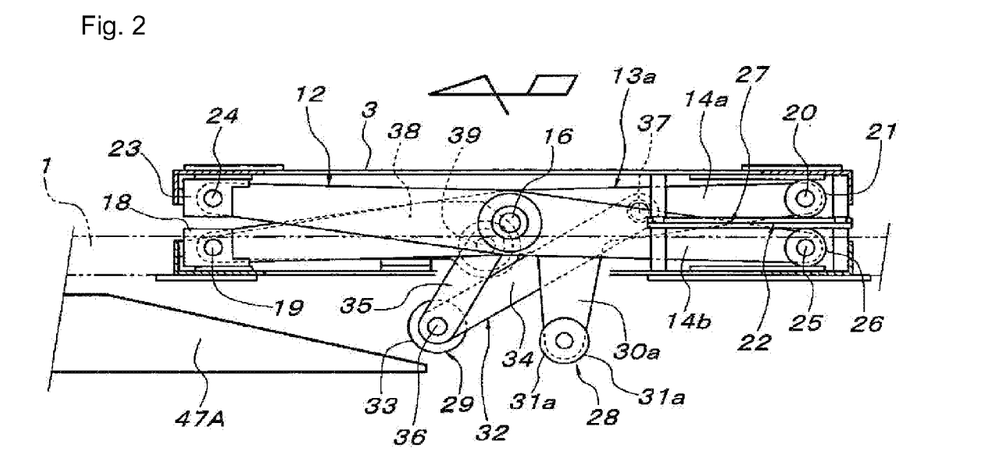
FIG. 2 is a longitudinally sectional side view showing a main part with a platform located at a lowering limit height.

The platform 3 is normally stable by gravity in a condition lowered to a lowering limit height shown in FIG. 2. This time, the lowering limit height of the platform 3 can be determined by a height-adjustable support tool (which is conventionally well known, and illustration is omitted) provided in a standing condition on the conveying traveler body 1 side. When the platform 3 is located at a lowering limit height as such, the pair of right and left crosslinks 13a and 13b of the crosslink mechanism 12 are in a fallen condition as shown in FIG. 2, and the pair of right and left cam follower rollers 31a and 31b of the first to-be-operated portion 28 are protruded from the bottom surface of the conveying traveler body 1 at the maximum. The cam follower roller 33 of the second to-be-operated portion 29 is at an almost identical level as that of the cam follower rollers 31a and 31b of the first to-be-operated portion 28, and the toggle link 32 equipped with the cam follower roller 33 is collapsed so that the free-end fulcrums (hanging member (spindle member) 37 and spindle 39) of both links 34 and 35 all are located backward in the traveling direction of the conveying traveler body 1 relative to the cam follower roller 33. Accordingly, in this condition, it is impossible to push up the cam follower roller 33 upward so as to make the crosslinks 13a and 13b stand up.

Figure 7:
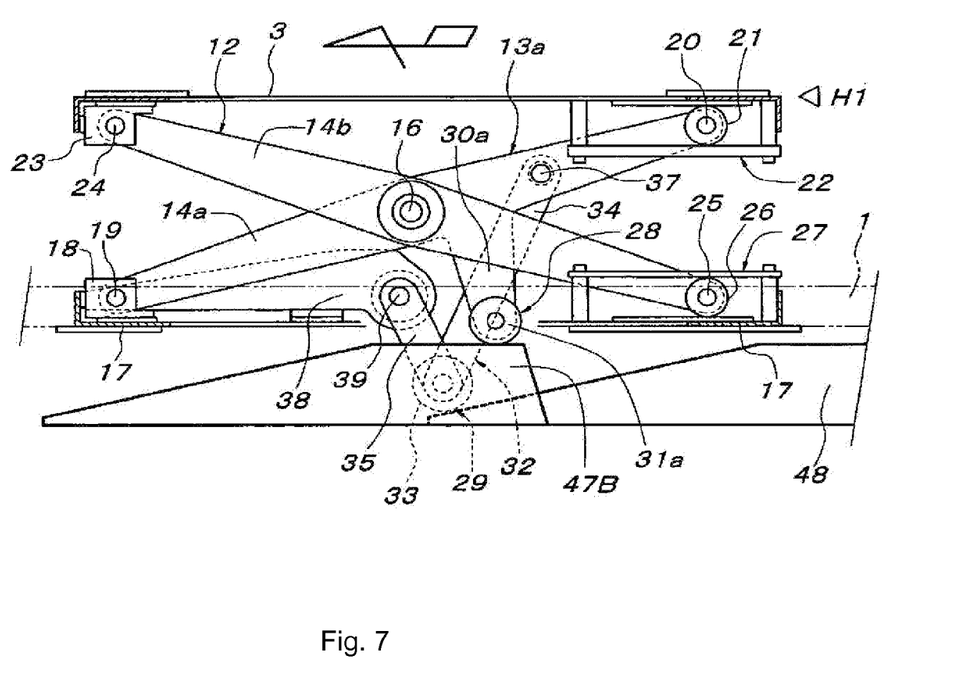
FIG. 7 is a longitudinally sectional side view showing a main part with a platform lowered to a middle height.

On the other hand, at a start portion of a specific section where the platform 3 is kept lifted in a conveying route by the conveying traveler body 1, as shown in FIG. 5, a pair of right and left start-side first cam rails 47A that push up the pair of right and left cam follower rollers 31a and 31b of the first to-be-operated portion 28 as a result of a forward travel of the conveying traveler body 1 are laid down, and at an end portion of the specific section, as shown in FIG. 7, a pair of right and left end-side first cam rails 47B that accept the descending pair of right and left cam follower rollers 31a and 31b of the first to-be-operated portion 28 and then allow the cam follower rollers 31a and 31b to descend as a result of a forward travel of the conveying traveler body 1 are laid down, and furthermore, in the specific section from the vicinity of end portions of the start-side first cam rails 47A to the vicinity of start portions of the end-side first cam rails 47B, a second cam rail 48 that pushes up the cam follower roller 33 of the second to-be-operated portion 29 as a result of a forward travel of the conveying traveler body 1 and holds the same at a predetermined height is laid down.

Figure 3:
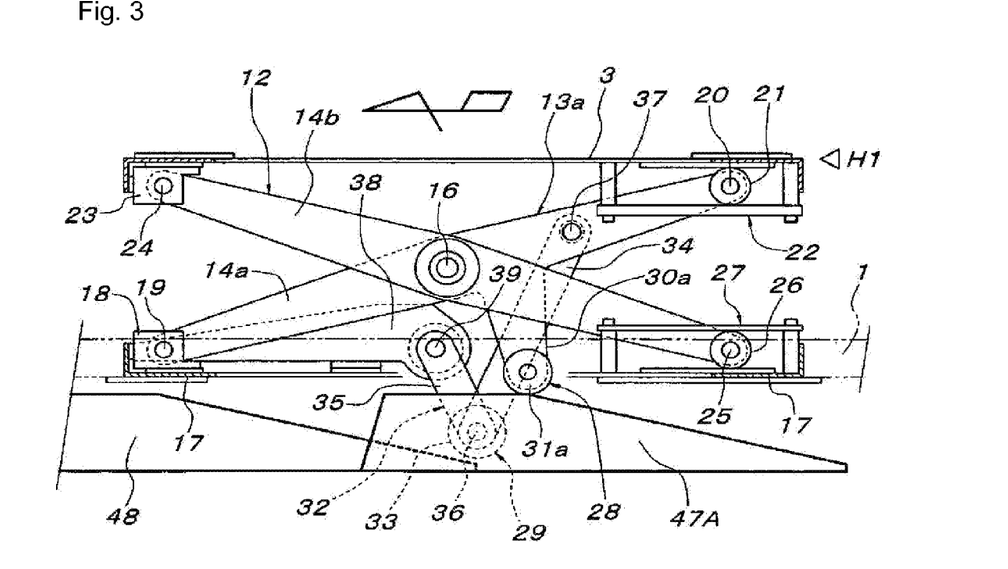
FIG. 3 is a longitudinally sectional side view showing a main part with a platform lifted to a middle height.
Figure 4:
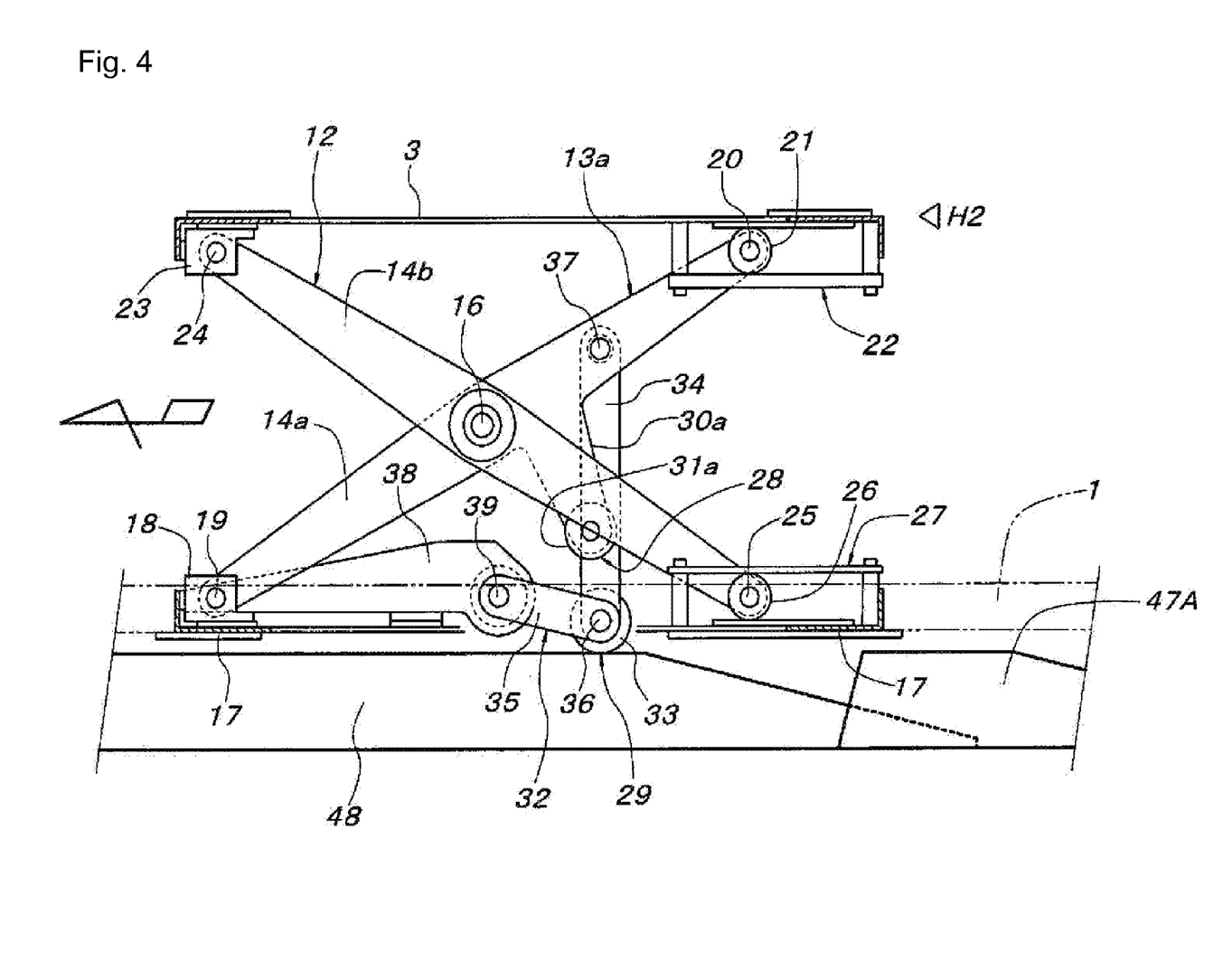
FIG. 4 is a longitudinally sectional side view showing a main part with a platform lifted to a maximum height.

Therefore, when the conveying traveler body 1 enters the specific section, the pair of right and left cam follower rollers 31a and 31b of the first to-be-operated portion 28 gradually ride on the pair of right and left start-side first cam rails 47A as shown in FIG. 3, and the pair of right and left start-side first cam rails 47A thrust up the inside links 14a and 15a of the pair of right and left crosslinks 13a and 13b via the pair of right and left cam follower rollers 31a and 31b. Accordingly, the pair of right and left crosslinks 13a and 13b carry out a standing motion in conjunction with each other, so that the platform 3 supported by the pair of right and left crosslinks 13a and 13b rises while maintaining a horizontal posture.

As shown in FIG. 3, as a result of the pair of right and left cam follower rollers 31a and 31b reaching the highest flat surfaces of the pair of right and left start-side first cam rails 47A, the platform 3 reaches a predetermined middle height H1, however, with the standing motion of the crosslinks 13a and 13b during the time where the platform 3 is lifted from the lowering limit height to the middle height H1, the toggle link 32 is slightly extended into a V-shape from the collapsed condition shown in FIG. 2, the cam follower roller 33 moves rearward at an almost identical level, resulting in a condition where the free-end fulcrums (hanging member (spindle member) 37 and spindle 39) of the toggle links 32 are arranged with respect to the cam follower roller 33 in a condition separated at the front and rear. Therefore, in this condition, by pushing up the cam follower rollers 33, the toggle link 32 can further be extended so as to make the crosslinks 13a and 13b carry out a standing motion.

The second cam rail 48 is laid down so that the cam follower roller 33 of the second to-be-operated portion 29 starts to ride on the second cam rail 48 during the time where the cam follower rollers 31a and 31b are rolling on the highest flat surfaces of the start-side first cam rails 47A. As a matter of course, the highest flat surfaces may be substantially eliminated from the start-side first cam rails 47A so that the cam follower roller 33 of the second to-be-operated portion 29 starts to ride on the second cam rail 48 immediately before the cam follower rollers 31a and 31b leave the highest positions of the start-side first cam rails 47A.

Therefore, when the cam follower roller 33 of the second to-be-operated portion 29 gradually rides on the second cam rail 48 as a result of a travel of the conveying traveler body 1, the short link 35 of the toggle link 32 swings upward around the spindle 39, and the long link 34 thrusts up the crosslinks 13a and 13b via the hanging member (spindle member) 37 and furthermore makes the same carry out a standing motion. Therefore, when the cam follower roller 33 has reached the highest flat surface of the second cam rail 48, the crosslinks 13a and 13b completely reach a standing condition, so that the platform 3 is lifted from the middle height H1 to a maximum height H2.

As described above, when the crosslinks 13a and 13b carry out a standing motion so as to lift the platform 3, the respective upper and lower common slide fulcrum shafts 20 and 25 of the pair of right and left crosslinks 13a and 13b slide horizontally forward via the rollers 21 and 26 and slide guides 22 and 27. However, when the locking means 40 shown in the virtual lines of FIG. 5 and FIG. 6 and in FIG. 8 is concurrently provided, the lower common slide fulcrum 25 (to-be-latched portions 41) passes while pushing up the pair of right and left latches 42 via inclined surfaces on the downside of the front ends thereof immediately before the platform 3 reaches the maximum height H2, and when the platform 3 has reached the maximum height H2, that is, when the cam follower roller 33 of the second to-be-operated portion 29 has reached the highest flat surface of the second cam rail 48, concave latching portions 42b of the pair of right and left latches 42 are fitted and latched with the lower common slide fulcrum shaft 25 (to-be-latched portions 41) from upside by gravity. As a matter of course, springs that forcedly charge the respective latches 42 downward may be used together.

Namely, with the locking means 40 concurrently provided, when the conveying traveler body 1 enters the specific section, the platform 3 that has been located at the lowering limit height is automatically lifted to the maximum height H2. At this time, as described above, the latches 42 of the locking means 40 are automatically latched with the to-be-latched portions 41 (lower common slide fulcrum shaft 25) of the crosslinks 13a and 13b so as to prevent the pair of right and left crosslinks 13a and 13b in a standing condition from carrying out a falling motion. Namely, the concave latching portions 42b of both latches 42 fitted with the common slide fulcrum shaft 25 (to-be-latched portions 41) prevents a rearward slide of the common slide fulcrum shaft 25 (to-be-latched portions 41) of the crosslinks 13a and 13b in a standing condition when the platform 3 is lowered from the maximum height H2. Therefore, even if the toggle link 32 that supports the cam follower roller 33 that has been pushed up by the second cam rail 48 is bent or broken during the time the conveying traveler body 1 is traveling in the specific section where the platform 3 is kept lifted to the maximum height, the platform 3 can be prevented from falling down from the maximum height H2.

Immediately before the end portion of the specific section, as shown in FIG. 8, unlocking cams 49 are laid down. The unlocking cams 49 are arranged on both right and left sides of the second cam rail 48 in a manner corresponding to the respective latches 42 so that the cam follower rollers 46 of the latches 42 ride thereon as the conveying traveler body 1 travels. The cam follower rollers 46 ride on the unlocking cams 49 so as to swing the latches 42 upward against gravity, the concave latching portions 42b of the latches 42 are separated upward from the common slide fulcrum shaft 25 (to-be-latched portions 41) of the crosslinks 13a and 13b, so that a lock to the crosslinks 13a and 13b in a standing condition is released.

After the unlocking operation described above, the conveying traveler body 1 reaches the end portion of the specific section, and the cam follower roller 33 of the second to-be-rotated portion 29 is ready to descend down an end downhill slope portion of the second cam rail 48 as the conveying traveler body 1 travels, so that the platform 3 is lowered while making the crosslinks 13a and 13b carry out a falling motion by gravity. Therefore, as shown in FIG. 7, when the platform 3 has reached the middle height H1 as the conveying traveler body 1 travels, that is, immediately before the cam follower roller 33 leaves the second cam rail 48, the pair of right and left cam follower rollers 31a and 31b of the first to-be-operated portion 28 are caught by the highest flat surfaces of the pair of right and left end-side cam rails 47B, and the cam follower rollers 31a and 31b are ready to descend downhill slope portions of the end-side first cam rails 47B as a result of a subsequent travel of the conveying traveler body 1, so that the platform 3 is further lowered from the middle height H1 while making the crosslinks 13a and 13b carry out a falling motion by gravity. Then, the conveying traveler body 1 exits the specific section, the cam follower rollers 31a and 31b leave the end-side first cam rails 47B, and the cross links 13a and 13b completely fall down so that the platform 3 returns to the lowering limit height being a home position.

In the conveying route of the conveying traveler body 1, a first specific section where the platform 3 is kept lifted to the maximum height H2 and a second specific section where the platform 3 is kept lifted to the middle height H1 can be provided. In this case, by forming the first specific section as in the embodiment and connecting, in the second specific section, the pair of right and left start-side first cam rails 47A and the pair of right and left end-side first cam rails 47B across the entire area of the second specific section, a condition where the platform 3 is pushed up to the intermediate height by the pair of right and left cam follower rollers 31a and 31b of the to-be-operated portion 28 can be maintained across the entire area of the second specific section.

Although the pair of right and left crosslinks 13a and 13b have been used, it is also possible to support the platform 3 freely so as to be liftable and lowerable by only one crosslink with broad width. In other words, the number of crosslinks that support one platform 3 is not limited. Moreover, as the first to-be-operated portion, as conventionally well known, a to-be-operated portion formed of a lifting/lowering member that thrusts up the crosslinks by rising so as to make the same stand up may be used.

The conveying apparatus according to the present invention can be utilized, on an automobile assembly line, as a conveying apparatus carrying a vehicle body (carried object) to which various parts are attached while mounting the same on a platform 3 and keeping, in a section of a parts fitting operation (specific section described in the embodiment where the second cam rail 48 has been laid down), the vehicle body (platform 3) lifted to a level where an operator on the conveying traveler body 1 can easily carry out a parts fitting operation.

What is claimed is:

1. A conveying apparatus comprising:
    a lifting/lowering platform in which a platform is supported on a conveying traveler body, the platform being liftable and lowerable via an erectable crosslink operable to lift the platform from a lowering limit height to a middle height and to a maximum height,
    the crosslink having first and second cam follower portions protruding below the conveying traveler body, the first cam follower portion engaging a first cam rail to lift the platform to the middle height and the second cam follower portion engaging a second cam rail to lift the platform from the middle height to the maximum height
    the second cam follower portion being provided at a middle bending fulcrum of a toggle link, the toggle link being interposed between a link of the crosslink and a fixing position on a conveying traveler body side of the conveying apparatus or in a vicinity thereof,
    the toggle link having two end fulcrums and being in a collapsed condition where the two end fulcrums are both located either in front or to a rear, in a traveling direction, with respect to the middle bending fulcrum when the platform is located at the lowering limit height,
    the toggle link being in an extended condition when the platform has been lifted to the middle height, where one of the two end fulcrums is located in front, in the traveling direction, with respect to the middle bending fulcrum and an other one of the two end fulcrums is located to the rear, in a traveling direction, with respect to the middle bending fulcrum, and
    when the toggle link is in the extended condition, the second cam follower portion is located lower than the first cam follower portion.

2. The conveying apparatus with a lifting/lowering platform according to claim 1, wherein
    the first cam follower portion is composed of a cam follower roller that is supported by a protruded portion depending downward from the link of the crosslink and the cam follower roller is directly pushed up by the first cam rail.

3. The conveying apparatus with a lifting/lowering platform according to claim 1, wherein
    the second cam follower portion is composed of a cam follower roller that is supported by the toggle link concentrically with the middle bending fulcrum and the cam follower roller is directly pushed up by the second cam rail.

4. The conveying apparatus with a lifting/lowering platform according to claim 1, further comprising:
    two crosslinks provided side by side as a pair of right and left crosslinks such that respective fulcrums of the right and left crosslinks are concentric with each other, the first cam follower portion is composed of a pair of right and left cam follower rollers that are respectively directly pushed up by juxtaposed two first cam rails and are respectively supported by two protruding portions depending downward from inside links of the respective crosslinks, and the toggle link having the second cam follower portion is interposed between a center portion of a hanging member provided between the inside links of the crosslinks and a fixing position on the conveying traveler body side of the conveying apparatus, and the second cam rail that works on the second cam follower portion is disposed at a middle position between the two first cam rails.

5. The conveying apparatus with a lifting/lowering platform according to claim 1, further comprising:

a locking means operable to prevent the crosslink from falling when the platform is at the maximum height.

6. The conveying apparatus with a lifting/lowering platform according to claim 5, wherein the locking means is composed of a latch that is automatically latched with a to-be-latched portion provided at a slide fulcrum position on the conveying traveler body side of the crosslink or in vicinity thereof.

7. A conveying apparatus comprising:
a lifting/lowering platform in which a platform is supported on a conveying traveler body, the platform being liftable and lowerable via an erectable crosslink operable to lift the platform from a lowering limit height to a middle height and to a maximum height,
the crosslink having first and second cam follower portions protruding below the conveying traveler body, the first cam follower portion engaging a first cam rail to lift the platform to the middle height and the second cam follower portion engaging a second cam rail to lift the platform from the middle height to the maximum height,
the second cam follower portion being provided at a middle bending fulcrum of a toggle link, the toggle link being interposed between a link of the crosslink and a fixing position on a conveying traveler body side of the conveying apparatus,
the toggle link having two end fulcrums and being in a collapsed condition where the two end fulcrums are both located either in front or to a rear, in a traveling direction, with respect to the middle bending fulcrum when the platform is located at the lowering limit height,
the toggle link being in an extended condition when the platform has been lifted to the middle height, where one of the two end fulcrums is located in front, in the traveling direction, with respect to the middle bending fulcrum and an other one of the two end fulcrums is located to the rear, in a traveling direction, with respect to the middle bending fulcrum, and
when the toggle link is in the extended condition, the second cam follower portion is located lower than the first cam follower portion.

8. The conveying apparatus with a lifting/lowering platform according to claim 7, wherein
the first cam follower portion is composed of a cam follower roller that is supported by a protruded portion depending downward from the link of the crosslink and the cam follower roller is directly pushed up by the first cam rail.

9. The conveying apparatus with a lifting/lowering platform according to claim 7, wherein
the second cam follower portion is composed of a cam follower roller that is supported by the toggle link concentrically with the middle bending fulcrum and the cam follower roller is directly pushed up by the second cam rail.

10. The conveying apparatus with a lifting/lowering platform according to claim 7, further comprising:
two crosslinks provided side by side as a pair of right and left crosslinks such that respective fulcrums of the right and left crosslinks are concentric with each other, the first cam follower portion is composed of a pair of right and left cam follower rollers that are respectively directly pushed up by juxtaposed two first cam rails and are respectively supported by two protruding portions depending downward from inside links of the respective crosslinks, and the toggle link having the second cam follower portion is interposed between a center portion of a hanging member provided between the inside links of the crosslinks and a fixing position on the conveying traveler body side of the conveying apparatus, and the second cam rail that works on the second cam follower portion is disposed at a middle position between the two first cam rails.

11. The conveying apparatus with a lifting/lowering platform according to claim 7, further comprising:
a locking means operable to prevent the crosslink from falling when the platform is at the maximum height.

12. The conveying apparatus with a lifting/lowering platform according to claim 11, wherein the locking means is composed of a latch that is automatically latched with a to-be-latched portion provided at a slide fulcrum position on the conveying traveler body side of the crosslink.

* * * * *